United States Patent [19]

Williams

[11] Patent Number: 4,589,252
[45] Date of Patent: May 20, 1986

[54] STEEP TERRAIN STABILIZING DEVICES FOR LAWN MOWERS

[76] Inventor: Will T. Williams, No. 6 Boundbrook Dr., Paris, Tenn. 38242

[21] Appl. No.: 651,021

[22] Filed: Sep. 17, 1984

[51] Int. Cl.$^4$ .................. A01D 75/28; B60B 15/00
[52] U.S. Cl. ........................ 56/255; 56/16.7; 301/44 R
[58] Field of Search ............ 56/255, 16.7; 301/41 R, 301/43, 44 R, 44 T; 180/15, 16

[56] References Cited

U.S. PATENT DOCUMENTS

| | | | |
|---|---|---|---|
| 590,734 | 9/1897 | Cross | 301/41 R |
| 870,548 | 11/1907 | Dentzeau | 301/44 T |
| 1,118,390 | 11/1914 | Bajar | 301/44 T |
| 1,419,350 | 6/1922 | Beers | 301/44 T |
| 2,598,851 | 6/1952 | Spevak | 301/43 |

FOREIGN PATENT DOCUMENTS 88223 10/1956 Norway ................................ 301/43

*Primary Examiner*—Robert P. Swiatek
*Assistant Examiner*—David L. Tarnoff
*Attorney, Agent, or Firm*—Penrose Lucas Albright

[57] ABSTRACT

Ground penetrating discs for selective attachment to wheels of a lawn mower to increase safe operation of such lawn mowers on embankments in which the ground engaging discs are selectively secured in engagement over the hub and tread of one or more of the lawn mower wheels and which include a plurality of outwardly extending ground penetrating points which are spaced around the periphery of the discs and which penetrate the earth's surface during operation of the lawn mower and prevent lateral slippage of the lawn mower as a lawn mower traverses a sloped surface.

6 Claims, 4 Drawing Figures

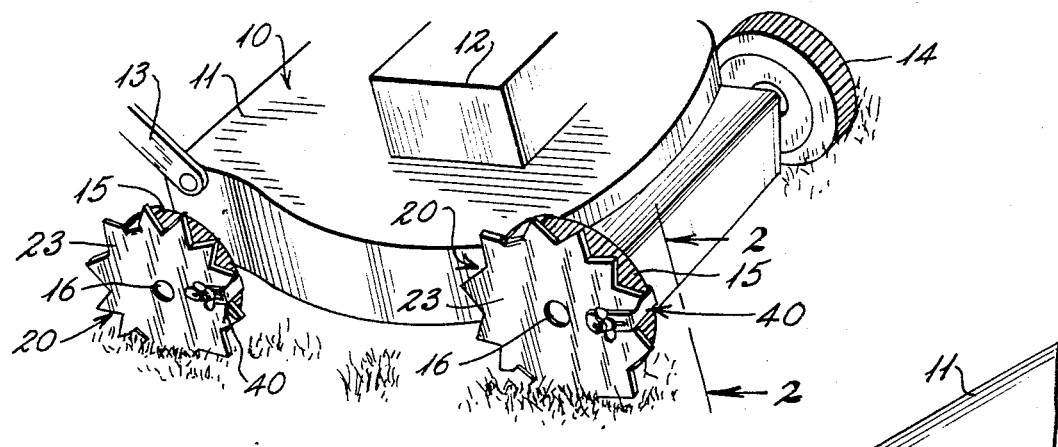
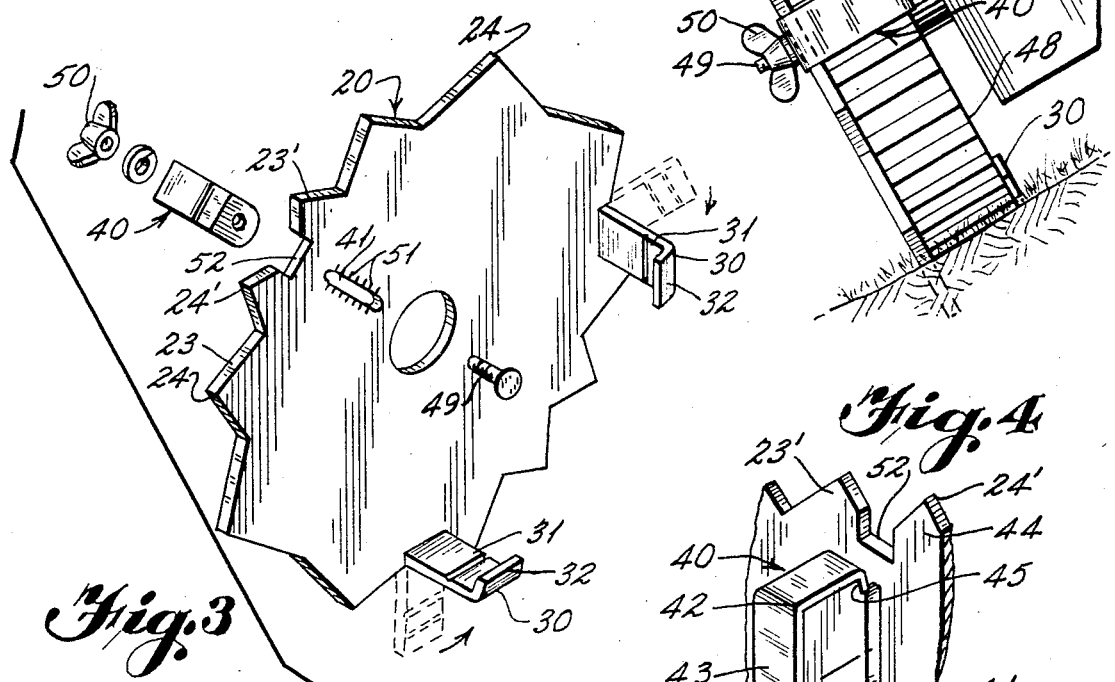
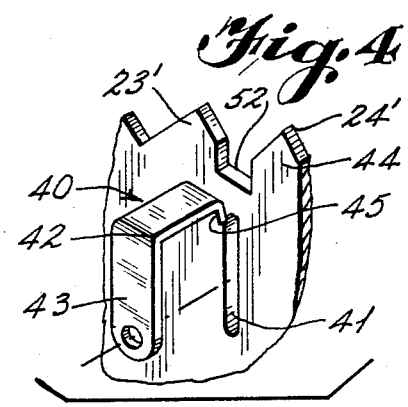

STEEP TERRAIN STABILIZING DEVICES FOR LAWN MOWERS

BACKGROUND OF THE INVENTION

1. Field of the Invention

This application is generally directed to safety devices for use in preventing lawn mower accidents and is particularly directed to a safety device for preventing lawn mowers from slipping or tipping while traversing a sloped embankment by providing ground penetrating discs which are selectively engageable with at least the downhill wheels of a lawn mowing vehicle so as to be readily attached to such wheels when the lawn mowing vehicle is to be used over sloped terrain where the vehicle is operated laterally from side to side across the surface of the terrain.

2. History of the Prior Art

Heretofore there have been many developments which have been proposed with respect to increasing the safe use of lawn mowing vehicles. Every year there are a great many accidents which cause severe bodily injury to people using lawn mowers on terrain where the footing of the operator is not stable and/or where the center of gravity of the lawn mowing vehicle is such as to induce the vehicle to slide, roll, or pitch to an extent where the operator is placed off balance resulting in loss of control of the vehicle.

The hazards associated with mowing embankments especially of steep grade are known by home owners as well as professional mowing services alike. Even with large tractor type vehicles, the possibilty of the vehicle rolling as it traverses the slope from side to side is very real. Numerous innovations have been proposed with respect to determining the maximum safe angle of operation for self powered vehicles. Such safety devices provide an audible or visual warning to an operator of a vehicle when they have exceeded the safe operating incline for the vehicle. Such complicated and expensive innovations are not provided on most lawn mowing equipment available on the market today and therefore the average lawn mower operator has no means of electrically or mechanically obtaining a warning that they are operating under conditions which may be unsafe.

In order to increase traction of lawn mowing vehicles along sloped surfaces, various rear drive train mechanisms have been proposed as well as enlarged rear wheel tread designs developed in an effort to prevent accidental rolling of a lawn mowing vehicle. In some instances, use has been made of outrigger type supports for preventing a lawn mowing vehicle from tilting or rolling as the mower is operated across a sloped embankment. Again, however, such outrigger devices are not readily available to most operators of lawn mowers and the expense of providing such an outrigger prohibits their use in most commercial markets.

An additional problem which is inherent in the use of lawn mowing devices is the fact that ground conditions can be such that the operator may easily slip on even a very sight incline due to ground moisture or dew conditions. The number of accidents attributable to the use of lawn mowing devices has resulted in a great deal of development of safety clutches and brakes for lawn mowers. Many such lawn mowers, however, rely on the operator during assembly of the lawn mower properly to install such safety devices and frequently such safety devices are bypassed or break down during use and are not available to the operator in the event that an accident does occur. In addition, many proposed lawn mower safety devices would not prevent some types of harm to an operator especially if a larger vehicle were to roll and spill the operator and perhaps pin the operator under the vehicle.

SUMMARY OF THE INVENTION

This invention is directed to safety devices for use with lawn mowing vehicles and particularly is directed to ground penetrating discs which are selectively mounted to one or more wheels of a lawn mowing vehicle and which include outwardly extending ground penetrating points which penetrate the earth's surface as the wheels of the lawn mowing vehicle transverse the earth's surface. The ground engaging discs include a plurality of generally equally spaced pointed teeth portions which extend outwardly beyond the tread surface of the wheel so that such teeth are urged into the earth's surface as the lawn mowing vehicle wheel is urged across the earth's surface. The ground penetrating discs are easily mountable over any lawn mower wheel by having at least a pair of bendable but fixed flange portions which may be urged over the tread portion of the vehicle wheel and into engagement with the opposite side thereof together with at least one selectively adjustably locking member which is also extendable over the tread portion of the wheel but which is adjustable so as to urge the locking member against the vehicle wheel thereby to retain the disc in position on the wheel of the lawn mowing vehicle.

It is a primary object of this invention to provide a relatively inexpensive solution to preventing accidental rolling and slipping of lawn mowing vehicles during their use on inclined surfaces.

It is another object of this invention to provide ground penetrating discs which may be selectively and quickly mounted directly to one or more of the wheels of a lawn mowing machine and which include a plurality of outwardly extending penetrating points which will penetrate the earth's surface during the rotation of the wheels and thereby prevent any lateral slippage of the lawn mower as it traverses terrain which is either sloped, banked or otherwise graded on a vertical incline.

It is yet another object of the present invention to provide a relatively inexpensive device for attachment to the wheels of a conventional lawn mowing device which attachment can be stamped from metallic material or may be molded from various plastic materials and which includes outwardly extending ground penetrating points which extend beyond the periphery of the vehicle wheels so as to penetrate the earth's surface during rotation of the wheels and which is secured into position by integrally formed tab members which engage the wheels and which cooperate with a manually adjustable locking member to ensure that the attachments will not slip during operation of the vehicle.

It is another object of the invention to provide a safety device for use with lawn mowers which will ensure that the lawn mowing vehicle is stabilized while traversing sloped surfaces and thereby not only provide a means for preventing the lawn mower from accidentally slipping, rolling or tipping on itself but also provides an anchor to prevent an operator from being accidentally injured through a loss of footing on inclined terrain.

BRIEF DESCRIPTION OF THE DRAWINGS

FIG. 1 is a partial illustrational view showing two of the ground penetrating safety discs of the present invention as they are mounted to the downhill wheels of a conventional push mower.

FIG. 2 is an enlarged partial view taken along lines 2—2 of FIG. 1 showing one ground penetrating safety disc relative to the front wheel of a conventional lawn mowing device.

FIG. 3 is a perspective assembly view of a ground penetrating disc of the present invention showing the locking tabs as they are initially formed extending radially outwardly with respect to the disc (in dotted line) and as they are bent to engage a wheel of a conventional lawn mower wheel (in full line).

FIG. 4 is an enlarged partial perspective view showing one form of manual locking device associated with the ground penetrating discs of the present invention.

DESCRIPTION OF THE PREFERRED EMBODIMENT

With continued reference to the drawings, a conventional lawn mower 10 is shown in FIG. 1 as including a deck portion 11 which covers and surrounds the cutting blade (not shown), a motor housing 12 and handle means 13. In the illustrational view of FIG. 1, the conventional lawn mower 10 is shown as traversing a sloped surface in which the uphill wheels 14 are shown as being elevated with respect to the downhill wheels 15. The wheels 14 and 15 are normally connected to the blade housing 11 by wheel mounting bolts 16 in such a manner that the mounting bolts may be removed to adjust selectively the vertical orientation of the vehicle wheels with respect to the lawn mower housing 11 thereby to select the proper cutting height of the lawn mower blade.

The lawn mower ground engaging safety discs 20 of the present invention are shown in FIG. 1 as being attached to the downhill wheels 15 of a conventional push mower. It should be noted that the ground engaging discs of the present invention may also be used with powered riding mowers as well as with larger vehicles such as used by state agencies for mowing grassy areas of highways and which may include tractors of the type having large drive wheels which may be in excess of three to five feet in diameter. When the ground penetrating discs are manufactured for use with heavier vehicles, it will be necessary to use stronger metallic materials than would otherwise be necessary for use with conventional push or riding mowers such as shown in FIG. 1.

As previously discussed, with the use of relatively small three and three and one-half horse power conventional lawn mowers, the ground penetrating disc may be formed of a sheet metal material or may be formed of a plastic material having sufficient strength to permit the disc to be used to support the weight of the lawn mower on an inclined surface. It should also be noted that the ground penetrating safety discs of the present invention may be utilized both with conventional molded plastic wheels as well as pneumatic tires or solid rubber tires found on larger lawn mowing vehicles or tractors.

With particular reference to FIGS. 3 and 4, ground penetrating safety discs of the present invention include a generally planar body portion which is defined by a main body portion and an outer continuous periphery having a diameter which is generally equal to the diameter of the lawn mower wheel to which the discs will be secured. Each disc has a plurality of outwardly extending ground penetrating teeth 23 integrally formed therewith which extend outwardly beyond the main body portion. As shown in the drawings, the ground penetrating teeth are generally equally spaced around the periphery of the discs and the points 24 thereof are for the most part generally radially aligned with the central axis of the discs. Preferably, the penetrating points 24 of the teeth as well as the configuration of the teeth 23 should be as symmetrically and equally spaced as possible around the periphery of the discs so that there is equal resistance to movement during rotation of the disc through a continuous revolution of the vehicle wheel to which the disc is attached. In addition, the teeth 23 should be spaced so that the penetrating points 24 provide a continuous penetrating contact with the earth's surface during the rotation of lawn mowing vehicle wheel and therefore at least two of the teeth will be in engagement with the earth's surface at any point during the rotation of the lawn mowing vehicle wheel.

Although the symmetry of the ground penetrating points 24 is of importance, there may be some deviation between the spacing of a point without adversely affecting the ground engaging capability of the ground penetrating disc during use. For instance, the ground penetrating safety discs of the preferred embodiment of the present invention are designed so that the operator of a lawn mowing vehicle may selectively attach such safety devices to the wheels without having to remove the wheels from the lawn mower. Therefore, it is necessary to provide means for attaching the lawn mower safety discs to the wheels by clamping means which engage the wheel along the outer periphery thereof as shown in FIG. 1 of the drawings. It is contemplated that the teeth may be equally spaced around the total periphery of the ground penetrating discs with each disc being mounted over the mounting bolt 16 of the vehicle wheels and thereby provide uniform ground penetrating capability at all times. In the preferred embodiment, however, it is realized that most mower vehicle operators will not remove the vehicle wheels in order to mount the safety discs especially if lawn mowing on an incline surface accounts for only a minor portion of the lawn which is being mowed.

In the preferred embodiment, the ground penetrating discs are selectively attachable over the surface of the ground engaging wheels, such as shown at 15, by means of at least two stationary clips 30 which are generally U-shaped and extend outwardly from the periphery of the main body portion of the ground engagement discs at points which are spaced approximately one-third of the distance around the circumference of the disc. Each bracket member or clip 30 includes a tire tread traversing or engaging portion 31 and an inner tire surface engaging portion 32. As previously discussed, the discs may be stamped from a sheet metal material with the clip portions integrally formed therewith. The clips may thereafter be formed by bending the outwardly extending tabs shown in FIG. 3 in dotted line to form the generally U-shaped configuration shown in the drawings in full line.

In addition to the two spaced stationary clips 30, a selectively adjustable locking bracket 40 is mounted to the ground penetrating discs through an elongated slot 41. The elongated slot extends inwardly from adjacent the periphery of the main body portion toward the central axis of the ground engaging discs. Further, the slot should be located such that the locking bracket will be positioned at a point generally between the mounting tab portions 30 so as to be equally spaced with respect thereto about the periphery of the discs.

The adjustable mounting clamp 40 includes a generally U-shaped mounting bracket 42 having a first leg portion 43 which extends along the outer face 44 of the disc as shown in FIG. 4. A generally parallel leg member 45 is spaced from leg portion 43 and extends along the inner portion 48 of the lawn mower wheel. The first leg portion 43 is selectively united with the ground penetrating disc by use of fasteners such as a screw 49 and wing nut 50. The locking engagement between the adjustable mounting clamp 40 and the ground penetrating disk 20 is ensured by providing a series of locking serrations 51 which are formed along the length of the slot 41. As the orientation of the elongated slot 41 is generally radial with respect to the central axis of the disc, the adjustable mounting clamp may be slidingly adjustable radially inwardly and outwardly with respect to the central axis thereof. In this manner, the adjustable mounting clamp may be selectively positioned so as to be in abutting contact with the tread portion of a lawn mower wheel to which the ground engaging disc is attached after which the time the fastening means is tightened to lock the clamp 40 in engagement with the discs.

In order to permit the adjustable mounting clamp 40 to be properly seated with the outer periphery of the main body portion as well as to permit the clamp to be more radially adjustable with respect to the slot 41, a notch 52 is provided in the area which would normally be occupied by one of the teeth 23 with the central portion of the notch being axially aligned with the elongated slot and central axis of the ground engaging disc. The notch is formed to be of a width to receive cooperatively the adjustable mounting clamp therein as shown in FIG. 3. As the notch 52 is formed in the area which is otherwise occupied by a tooth 23, the teeth 23' which are formed on either side thereof are somewhat smaller than the teeth 23 which are otherwise formed along the outer portion of the ground engaging disc. Each of the smaller ground engaging teeth 23' has an outwardly extending point or tip 24' which is generally spaced outwardly of the inner periphery of a disc a distance equal to the points 24 of the teeth 23.

In the use of the ground engaging safety disc 20 of the present invention, a disc having a main body portion of a diameter substantially equal to that of the lawn mower wheels to which the disc will be attached is selected for mounting to the lawn mower wheels. After the stationary mounting bracket 30 has been bent to the generally U-shaped configuration shown in FIG. 3, the wheel of the lawn mower is elevated slightly and thereafter the ground engaging disc is positioned adjacent thereto so that the tread of the wheel is rested within the U-shaped stationary mounting brackets 30. The adjustable mounting clamp which is freely slidable along the elongated opening 41 is thereafter forced radially inwardly towards the center of the disc so that the U-shaped mounting bracket 42 thereof is brought into tightly abutting engagement with the tread of the lawn mower wheel. The fastening means is thereafter secured to lock the adjustable mounting clamp in position.

During operation of the lawn mower, as the wheels are rotated, the teeth of the ground engaging discs will penetrate the earth's surface and thereby prevent the lawn mower from any lateral slipping relative to the ground as the lawn mower is moved across the slope. It is generally preferred that the ground engaging discs be mounted to at least two wheels of the lawn mower and on the same side thereof. As shown in the drawings, the ground engaging discs are mounted to the downhill side or downhill wheels of the lawn mower. If desired, the disc could be mounted on the opposite side of the mower, however, it is preferred that the downhill side be utilized as the weight of the mower will be distributed toward the downhill wheels.

Most common wheel sizes for push-type mowers are generally six to eight inches in diameter. In this respect the ground engaging discs should have an inner main body diameter of six to eight inches with the teeth extending approximately one inch outwardly therefrom. As previously mentioned, however, the discs of the present invention may be manufactured for use with larger lawn mowing vehicles having wheel diameters in excess of one foot or more. In addition to the diameter of the ground engaging discs being increased, the size of the stationary mounting bracket 30 and of the adjustable mounting bracket will also be varied in order to compensate for the width of the tire of the lawn mowing vehicle to which the discs will be attached.

Having thus disclosed my invention, what I claim as new and to be secured by Letters Patent of the United States is:

1. Safety apparatus for attachment to a vehicle's wheels to prevent lateral skidding when traversing sloped terrain which comprises:
   disc means having a main body portion adapted to bear against the vertical side of one of the vehicle's wheels and rotate therewith;
   a plurality of ground penetrating teeth means extending outwardly from said main portion having outermost points which extend substantially equal distances from the periphery of the vehicle's wheel on which said disc means is to be mounted, said outermost points being spaced sufficiently close together around said main portion's periphery to ensure that at least two of said teeth means continuously engage underlying sod when mounted on said wheel; and
   readily removable adjustable mounting means for securing said disc means in firm engagement with the lateral side of said wheel so that said body position is substantially centered with the wheel's axis of rotation, said mounting means comprising two separated hook-shaped bracket means which are rigidly attached to and extend normally from said disc means and are formed to grip the tread of the vehicle's wheel on which they are to be mounted and a clamp means which is also formed to receive and grip the vehicle's wheel on which it is to be mounted, said clamp means selectively movably secured to said main body portion of said disc means in a locking engagement whereby both said bracket means and said clamp means are urged against the tread of the vehicle's wheel on which said disc means is to be mounted.

2. A safety apparatus for use with lawn mowing vehicles to prevent lateral slippage of such vehicles when traversing across sloped terrain to be selectively mounted to the wheels of such vehicles comprising disc means having a main body portion adapted to engage the vertical sides of one of said wheels and a generally central rotational axis, a plurality of ground penetrative teeth means extending outwardly from said body portion so as to extend generally perpendicularly with respect to said rotational axis, and adjustable mounting means adapted readily to secure said disc means selectively and rigidly to the wheels of at least two different diameters of such lawn mowing vehicles so that said teeth means extend radially outwardly from the outer periphery of either of said wheels as seen from the side, said teeth means being generally equally spaced about the periphery of said main body portion to ensure that at least two said teeth means are engaging the terrain at all times, said mounting means including at least two wheel engaging members which extend perpendicularly with respect to said body portion of said disc means and are spaced relative to one another along the periphery of said main body portion, each of said wheel engaging members having a flanged portion adjacent the outermost end thereof which extends inwardly in generally parallel relationship with respect to said main body portion of said disc means grippingly to engage the inner side of the selected wheel of the lawn mowing vehicle, and at least one adjustable mounting bracket means being radially selectively movable to engage the inner side of the selected wheel of the lawn mowing vehicle, and means for securing said adjustable mounting bracket means in an adjusted position relative to said disc means.

3. The safety apparatus of claim 2 including a slot in one of said teeth means, said adjustable mounting bracket means being moveable within said slot, an elongated radially extending opening in said main body portion of said disc means, said elongated opening being generally aligned between said rotational axis of said disc means and said slot and fastening means selectively extendable through said opening to secure said adjustable mounting bracket means relative to said disc means.

4. The safety apparatus of claim 2 in which said disc means, said teeth means and said wheel engaging members are integrally formed from a sheet of material.

5. The safety apparatus of claim 4 in which said disc means, said teeth means and wheel engaging members are stamped from a sheet of metallic material.

6. Safety apparatus for attachment to a vehicle's wheels to prevent lateral slippage when traversing sloped terrain which comprises:

disc means having a main body portion adapted to bear against the vertical side of one of the vehicle's wheels and rotate therewith;

a plurality of ground penetrating teeth means extending outwardly from said main portion having outermost points which are equal distances from the center of said disc by an amount greater than the radius of the vehicle's wheel on which said disc means is to be mounted, said outermost points being spaced sufficiently close together around said main portion's periphery to ensure that at least two of said teeth means are engaging underlying ground surface at all times when mounted on said wheel; and readily removable adjustable mounting means for securing said disc means in firm engagement with the lateral side of said wheel so that said center is substantially aligned with the wheel's axis of rotation, said mounting means comprising two separated hook-shaped bracket means which are integral with said disc means and are formed to grip the tread of the vehicle's wheel on which they are to be mounted and a clamp means which is formed to receive the vehicle's wheel on which it is to be mounted, said clamp means selectively movably secured to said main body portion of said disc means in a locking engagement whereby both said bracket means and said clamp means are urged against the tread of the vehicles's wheel on which said disc means is to be mounted.

* * * * *